United States Patent
Guo

(10) Patent No.: US 12,192,132 B2
(45) Date of Patent: Jan. 7, 2025

(54) METHOD AND DEVICE FOR SRS TRANSMISSION, NETWORK DEVICE AND UE

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 517 days.

(21) Appl. No.: 17/453,320

(22) Filed: Nov. 2, 2021

(65) Prior Publication Data
US 2022/0182199 A1    Jun. 9, 2022

Related U.S. Application Data

(63) Continuation of application No. PCT/CN2020/105209, filed on Jul. 28, 2020.
(Continued)

(51) Int. Cl.
*H04L 5/00* (2006.01)
*H04W 64/00* (2009.01)
*H04W 72/23* (2023.01)

(52) U.S. Cl.
CPC ......... *H04L 5/0048* (2013.01); *H04W 64/006* (2013.01); *H04W 72/23* (2023.01)

(58) Field of Classification Search
CPC .............. H04L 5/0048; H04L 5/0032; H04L 5/0087; H04L 5/0096; H04W 64/006; H04W 72/23; H04W 52/146; H04W 52/325
See application file for complete search history.

(56) References Cited

U.S. PATENT DOCUMENTS

| 11,924,803 B2 * | 3/2024 | Kim ............... H04L 5/0051 |
| 2011/0117926 A1 | 5/2011 | Hwang |

(Continued)

FOREIGN PATENT DOCUMENTS

| CN | 102265687 A | 11/2011 |
| CN | 104335639 A | 2/2015 |

(Continued)

OTHER PUBLICATIONS

Ericsson: "UL Reference Signals for NR Positioning", 3GPP Draft; R1-1907509, May 3, 2019, XP051709524. 7 pages.
(Continued)

*Primary Examiner* — Ayaz R Sheikh
*Assistant Examiner* — Tarell A Hampton
(74) *Attorney, Agent, or Firm* — PERKINS COIE LLP

(57) ABSTRACT

A method and device for SRS transmission, a network device and a UE are provided. The method includes: a serving cell transmits, to a UE, a first configuration for positioning, the first configuration is configuration of a first SRS resource or configuration of a first SRS resource set; and the serving cell receives a first location information request from a location server, the first location information request is used for requesting the serving cell to measure the SRS transmission from the UE; here, a second location information request is transmitted to a neighbor cell by the location server, the second location information request is used for requesting the neighbor cell to measure the SRS transmission from the UE.

20 Claims, 8 Drawing Sheets

Related U.S. Application Data

(60) Provisional application No. 62/884,068, filed on Aug. 7, 2019.

(56) References Cited

U.S. PATENT DOCUMENTS

| | | | |
|---|---|---|---|
| 2012/0099503 A1* | 4/2012 | Guo | H04W 64/00 370/312 |
| 2013/0022096 A1 | 1/2013 | Kazmi | |
| 2013/0051317 A1 | 2/2013 | Tingfang et al. | |
| 2013/0294401 A1 | 11/2013 | Yoon | |
| 2014/0003240 A1 | 1/2014 | Chen | |
| 2014/0003302 A1 | 1/2014 | Han | |
| 2014/0098780 A1* | 4/2014 | Kim | H04W 72/0446 370/329 |
| 2014/0301217 A1 | 10/2014 | Choi | |
| 2017/0227625 A1 | 8/2017 | Markhovsky et al. | |
| 2017/0280415 A1 | 9/2017 | Kim | |
| 2018/0220392 A1 | 8/2018 | Ly | |
| 2018/0263009 A1 | 9/2018 | Cimpu et al. | |
| 2020/0169369 A1* | 5/2020 | Gao | H04L 5/0048 |
| 2021/0067289 A1* | 3/2021 | Zhu | H04B 7/088 |
| 2021/0328739 A1* | 10/2021 | Davydov | H04W 72/542 |
| 2021/0377774 A1* | 12/2021 | Yu | H04B 7/024 |
| 2021/0377904 A1* | 12/2021 | Huang | H04W 56/006 |
| 2022/0216963 A1* | 7/2022 | Chen | H04L 25/0228 |

FOREIGN PATENT DOCUMENTS

| | | |
|---|---|---|
| CN | 106793068 A | 5/2017 |
| WO | 2017037518 A1 | 3/2017 |
| WO | 2018090697 A1 | 5/2018 |

OTHER PUBLICATIONS

Huawei et al: "SRS design for NR Positioning", 3GPP Draft; R1-1906053, May 3, 2019, XP051708095. 9 pages.

Ericsson: "Offline discussion summary for 7.2.10.2 UL Reference Signals for NR Positioning", 3GPP Draft; R1-1907765, May 16, 2019, XP051740038. 17 pages.

Partial Supplementary European Search Report in the European application No. 20850838.2, mailed on May 11, 2022. 15 pages.

Supplementary European Search Report in the European application No. 20850838.2, mailed on Aug. 16, 2022. 12 pages.

CATT. "UL Reference Signals for NR Positioning" R1-1906306, 3GPP TSG RAN WG1 Meeting #97, May 4, 2019 (May 4, 2019).

OPPO. "Discussion on UL Reference Signals for NR Positioning" R1-1910122, 3GPP TSG RAN WG1 #98bis, Oct. 4, 2019 (Oct. 4, 2019).

International Search Report in the international application No. PCT/CN2020/105209, mailed on Oct. 29, 2020.

Written Opinion of the International Search Authority in the international application No. PCT/CN2020/105209, mailed on Oct. 29, 2020.

Supplementary European Search Report in the European application No. 24153511.1, mailed on May 15, 2024. 9 pages.

First Office Action of the European application No. 20850838.2, issued on Mar. 15, 2023. 5 pages.

First Office Action of the Chinese application No. 202210081548.8, issued on Apr. 12, 2023. 17 pages with English translation.

Second Office Action of the European application No. 20850838.2, issued on Jul. 18, 2023. 4 pages.

* cited by examiner

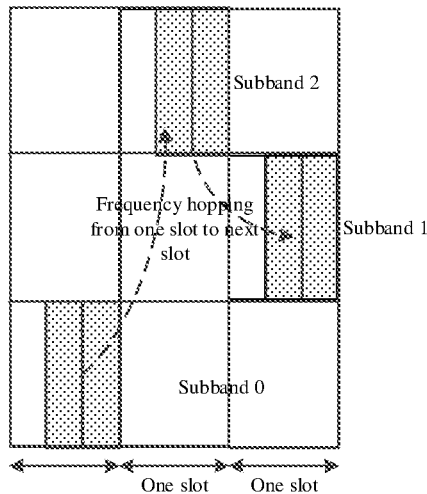

FIG. 2c

```
┌─────────────────────────────────────────────────────────┐  301
│   A serving cell transmits, to a UE, a first configuration for │ ╱
│  positioning, here, the first configuration is configuration of a first │
│       SRS resource or configuration of a first SRS resource set │
└─────────────────────────────────────────────────────────┘
                              │
                              ▼
┌─────────────────────────────────────────────────────────┐
│  The serving cell receives, from the location server, a first location │
│   information request, here, the first location information request is │  302
│ used for requesting the serving cell to measure the SRS transmission │ ╱
│        from the UE, here, a second location information request is │
│   transmitted to a neighbor cell by the location server and the second │
│   location information request is used for requesting the neighbor cell │
│           to measure the SRS transmission from the UE │
└─────────────────────────────────────────────────────────┘
```

METHOD AND DEVICE FOR SRS TRANSMISSION, NETWORK DEVICE AND UE

CROSS-REFERENCE TO RELATED APPLICATIONS

The application is a continuation of International Application No. PCT/CN 2020/105209 filed on Jul. 28, 2020, which claims priority and rights to U.S. Provisional Application No. 62/884,068 filed on Aug. 7, 2019. The contents of these applications are incorporated by reference herein in their entirety.

BACKGROUND

Semi-persistent and aperiodic Sounding Reference Signal (SRS) transmission is controlled by a serving cell. There is no collaboration on activation/deactivation or triggering of the SRS transmission between the serving cell and a neighbor cell. Therefore, when the serving cell activates or triggers an SRS transmission for positioning, the neighbor cell is not aware that transmission and thus does not receive it for measuring a Reference signal time difference (RSTD). Periodic SRS transmission is configured and re-configured by Radio Resource Control (RRC) signaling. Therefore, a system has to use the RRC signaling to stop the SRS transmission for positioning when a location service is not launched, which results in great signaling overhead and large latency.

SUMMARY

The embodiments of the present disclosure relate to a field of mobile communication technologies and provide a method and device for SRS transmission, a network device and a User Equipment (UE).

In a first aspect, the embodiments of the present disclosure may provide a method for SRS transmission, which may include the following operations.

A serving cell may transmit, to a UE, a first configuration for positioning. The first configuration may be configuration of a first SRS resource or configuration of a first SRS resource set.

The serving cell may receive, from a location server, a first location information request. The first location information request may be used for requesting the serving cell to measure the SRS transmission from the UE.

A second location information request may be transmitted to a neighbor cell by the location server and the second location information request may be used for requesting the neighbor cell to measure the SRS transmission from the UE.

In a second aspect, the embodiments of the present disclosure may provide a method for SRS transmission, which may include the following operations.

A UE may receive, from a serving cell, a first configuration for positioning. The first configuration may be configuration of a first SRS resource set.

The UE may receive, from the serving cell, a first command. The first command may be used for instructing the UE to perform transmission of the first SRS resource set in a mute pattern or an unmute pattern.

In a third aspect, the embodiments of the present disclosure may provide a device for SRS transmission, which includes a sending unit and receiving unit.

The sending unit may be configured to transmit, to a UE, a first configuration for positioning. The first configuration may be configuration of a first SRS resource or configuration of a first SRS resource set.

The receiving unit may be configured to receive, from a location server, a first location information request. The first location information request may be used for requesting a serving cell to measure the SRS transmission from the UE. A second location information request may be transmitted to a neighbor cell by the location server and the second location information request may be used for requesting the neighbor cell to measure the SRS transmission from the UE.

In a fourth aspect, the embodiments of the present disclosure may provide a device for SRS transmission, which includes a receiving unit.

The receiving unit may be configured to receive, from a serving cell, a first configuration for positioning, the first configuration being configuration of a first SRS resource set; and receive, from the serving cell, a first command, the first command being used for instructing a UE to perform transmission of the first SRS resource set in a mute pattern or an unmute pattern.

In a fifth aspect, the embodiments of the present disclosure may provide a network device, which may include a transceiver. The transceiver may be configured to transmit, to a UE, a first configuration for positioning, the first configuration being configuration of a first SRS resource or configuration of a first SRS resource set; and receive a first location information request from a location server, the first location information request being used for requesting a serving cell to measure the SRS transmission from the UE. A second location information request may be transmitted to a neighbor cell by the location server, and the second location information request may be used for requesting the neighbor cell to measure the SRS transmission from the UE.

In a sixth aspect, the embodiments of the present disclosure may provide a UE, which may include a transceiver. The transceiver may be configured to receive, from a serving cell, a first configuration for positioning, the first configuration being configuration of a first SRS resource set; and receive a first command from the serving cell, the first command being used for instructing User Equipment (UE) to perform transmission of the first SRS resource set in a mute pattern or an unmute pattern.

BRIEF DESCRIPTION OF THE DRAWINGS

The drawings described herein are used to provide a further understanding of the present application and form a part of the present application. The schematic embodiments and descriptions of the present application are used to explain the present application and do not constitute an undue limitation on the present application. In the drawings:

FIG. 2*c* is a diagram of SRS resource inter-slot frequency hopping according to the embodiments of the disclosure.

FIG. 3 is a first flowchart of a method for SRS transmission according to the embodiments of the disclosure.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

The technical solutions of the embodiments of the present disclosure may be applied to various communication systems, for example, a Long Term Evolution (LTE) system, a LTE Frequency Division Duplex (FDD) system, a LTE Time Division Duplex (TDD) system, a 5th Generation (5G) communication system or a future communication system.

Figure 1:
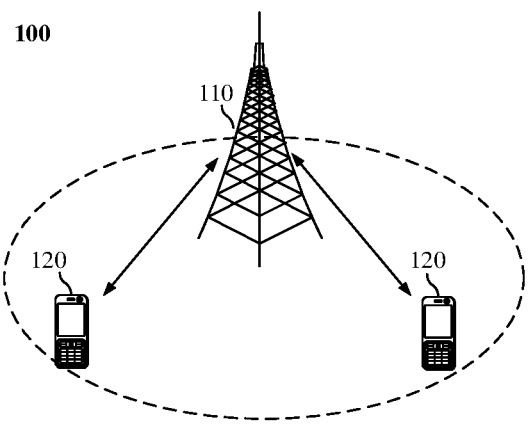
FIG. 1 is a diagram of architecture of a communication system according to the embodiments of the disclosure.

FIG. 1 is a diagram of architecture of a communication system 100 used by the embodiments of the present disclosure. The communication system 100 may include a network device 110. The network device 110 may be a device that communicates with a terminal 120 (or called a communication terminal or terminal). The network device 110 may provide communication coverage for a specific geographic area, and may communicate with terminals within the coverage area. Optionally, the network device 110 may be an Evolutional Node B (eNB or eNodeB) in an LTE system or a wireless controller in a Cloud Radio Access Network (CRAN); or the network device may be a mobile switching center, a relay station, an access point, a vehicle-mounted device, a wearable device, a hub, a switch, a network bridge, a router, a network-side device in a 5G network, or a network device in a future communication system etc.

The communication system 100 may also include at least one terminal 120 within the coverage of the network device 110. The terminal used herein may include, but is not limited to, a device that is configured to receive/transmit communication signals via a wired connection (such as via a Public Switched Telephone Networks (PSTN), Digital Subscriber Line (DSL), digital cable, direct cable connection, and/or another data connection/network) and/or via a wireless interface with, for example, a cellular network, a Wireless Local Area Network (WLAN), a Digital TV network such as Digital Video Broadcasting Handheld (DVB-H) network, a satellite network, an Amplitude Modulation (AM)-Frequency Modulation (FM) broadcast transmitter and/or another communication terminal; and/or an Internet of Things (IoT) device. A terminal configured to communicate over a wireless interface may be called "a wireless communication terminal", "a wireless terminal" or "a mobile terminal". Examples of the mobile terminal may include, but are not limited to, a satellite or cellular phone; a personal communications system (PCS) terminal that can combine a cellular radio telephone with data processing, facsimile, and data communication capabilities; a Personal Digital Assistant (PDA) that can include a radiotelephone, a pager, an Internet/intranet access, a Web browser, a notebook, calendar and/or a Global Positioning System (GPS) receiver; and a conventional laptop and/or palmtop receiver, or other electronic devices including radiotelephone transceivers. The terminal may be an access terminal, User Equipment (UE), a user unit, a user station, a mobile station, a mobile platform, a remote station, a remote terminal, a mobile device, a user terminal, a terminal, a wireless communication device and a user proxy or user device. The access terminal may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices connected to a wireless modem, a vehicle-amounted device, a wearable device, a terminal in a 5G network, or a terminal in a future evolved Public Land Mobile Network (PLMN).

Optionally, a direct Device to Device (D2D) communication may be performed between the terminals 120.

Optionally, the 5G communication system or 5G network may also be called a New Radio (NR) system or NR network.

FIG. 1 exemplarily illustrates one network device and two terminals. Optionally, the communication system 100 may include multiple network devices and other numbers of terminals may be within the coverage of each network device. This is not limited in the embodiments of the present disclosure.

Optionally, the communication system 100 may further include other network entities such as a network controller, a mobility management entity and the like. This is not limited in the embodiments of the present disclosure.

It should be understood that in the embodiments of the present disclosure, the device having a communication function in the network/system may be called a communication device. Taking the communication system 100 illustrated in FIG. 1 as an example, a communication device may include a network device 110 and a terminal 120 having a communication function; and the network device 110 and the terminal 120 may be specific devices described above, and are not described herein again. The communication device may also include other devices in the communication system 100, such as other network entities such as a network controller and a mobile management entity, which are not limited in the embodiments of the present disclosure.

It should be understood that the terms "system" and "network" in the present disclosure are usually used interchangeably. The term "and/or" in the present disclosure is only an association relationship describing associated objects and represents that three relationships may exist. For example, A and/or B may represent three conditions: i.e., independent existence of A, existence of both A and B and independent existence of B. In addition, character "I" in the present disclosure usually represents that previous and next associated objects form an "or" relationship.

For better understanding of the technical solutions of the embodiments of the present disclosure, the technical solutions related to the embodiments of the present disclosure are described in more detail below.

NR release 15 supports SRS transmission for uplink Channel State Information (CSI) acquisition, uplink beam management and antenna switching. A UE can be configured with one or more SRS resource sets and for each SRS resource set, the UE can be configured with K (K≥1) SRS resources. Every SRS resource set is configured with a use case through a higher layer parameter SRS-ResourceSet. The usage of SRS resource set includes: for codebook based Physical Uplink Shared Channel (PUSCH) transmission, for non-codebook based PUSCH transmission, for beam management and for antenna switching.

Each SRS resource contains 1, 2 or 4 antenna ports and 1, 2 or 4 consecutive symbols within one slot. In frequency-domain, SRS resource supports two types of RE mapping: Comb-2 and Comb-4. For Comb-2, SRS signal is mapped to one RE for every two REs and the candidate Comb offset values are 0 and 1. For Comb-4, SRS signal is mapped to one RE for every four REs and the candidate Comb offset values are 0, 1, 2 and 3. Examples of SRS signal mapping are illustrated in FIG. 2a.

Figure 2A:
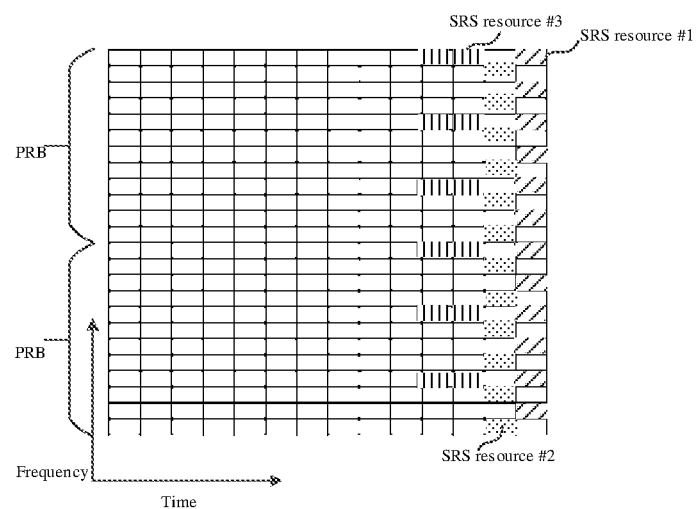
FIG. 2*a* is a diagram of SRS signal mapping according to the embodiments of the disclosure.

As illustrated in FIG. 2a, SRS resource #1 is configured with transmission comb 2 and comboffset=1. SRS resource #2 is configured with transmission comb 2 and comboffset=0. Both SRS resource #1 and #2 are configured with one symbol. SRS resource #3 is configured with two symbols and transmission comb 4.

NR system supports intra-slot and inter-slot frequency hopping for the transmission of one SRS resource. For a frequency hopping procedure, one SRS resource is configured with the following higher layer parameters: repetition factor R∈{1, 2, 4}, the number of symbols in one SRS resources: Ns∈{1, 2, 4} and SRS hopping parameters $B_{SRS}$ (UE-specific SRS bandwidth), $C_{SRS}$ (cell-specific SRS bandwidth) and $b_{hop}$ (frequency hopping bandwidth). The frequency hopping is configured implicitly through the value of R and Ns.

For R=1 and Ns=2 or 4: intra-slot frequency hopping. Each of antenna ports of the SRS resource in each slot is mapped to different sets of subcarriers in each symbol and same transmission comb value is assumed for different sets of subcarriers.

For R=2 and Ns=4: intra-slot frequency hopping.

For Ns=R, inter-frequency hopping is supported with each of the antenna ports of the SRS resource mapped to the same set of subcarriers in R adjacent symbols within a slot.

Figure 2B:
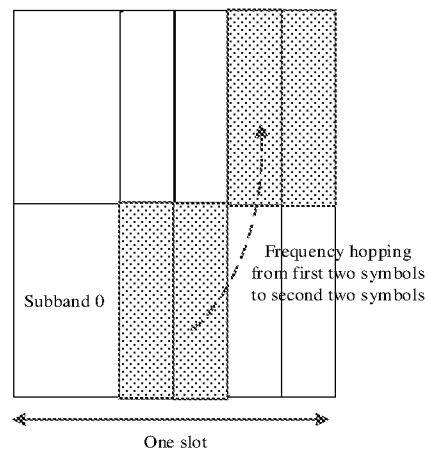
FIG. 2*b* is a diagram of SRS resource intra-slot frequency hopping according to the embodiments of the disclosure.

Examples of SRS resource intra-slot and inter-slot frequency hopping are illustrated in FIG. 2b and FIG. 2c. In the example of FIG. 2b, an SRS resource is configured with R=2 and Ns=4. Each of the antenna ports of the SRS resource is mapped to the same set of subcarriers within each 2 adjacent symbols in each slot.

In the example of FIG. 2c, an SRS resource is configured with R=2 and Ns=2. Here, inter-slot frequency hopping is supported. Each of the antenna ports of the SRS resource is mapped to the same set of subcarriers in 2 adjacent symbols in each slot.

Each SRS resource can be configured with spatialRelationInfo to indicate a Tx beam information for the transmission on that SRS resource. The spatialRelationInfo parameter can be an identifier (ID) of Channel State Information Reference Signal (CSI-RS), Synchronization Signal/Physical Broadcast Channel (SS/PBCH) block and SRS resource, configured by a serving gNB. If the spatialRelationInfo is a CSI-RS or SS/PBCH block, the UE shall transmit that SRS resource with Tx beam that corresponds to Rx beam used to receive the CSI-RS or SS/PBCH block. If the spatialRelationInfo is another SRS resource, the UE shall transmit that SRS resource with Tx beam same to that applied to the other SRS resource.

In one aspect, the semi-persistent and aperiodic SRS transmission is controlled by the serving cell. There is no collaboration on activation/deactivation or triggering of the SRS transmission between the serving cell and a neighbor cell. Therefore, when the serving cell activates or trigger an SRS transmission for positioning, the neighbor cell is not aware that transmission and thus does not receive it for measure RSTD. In another aspect, the periodic SRS transmission is configured and re-configured by RRC signaling. Therefore, the system has to use the RRC signaling to stop the SRS transmission for positioning when a location service is not launched, which results in great signaling overhead and large latency.

For this, the following technical solutions of embodiments of the present disclosure are proposed. In the present disclosure, methods of SRS transmission for positioning are proposed. One method is that: a serving gNB uses a mute command to temporarily suspend periodic SRS transmission for positioning. The merit of this method is to reduce physical resource waste and UE power consumption by muting the periodic SRS transmission for positioning when a location service is not used. One example method is that the serving gNB use a mute and un-mute command to control the transmission. Another example method is that the mute command includes a time duration for the muting. Another method is that: a mechanism to support semi-persistent and aperiodic SRS transmission for positioning. When a location service is requested, a serving cell can report transmission schedule of semi-persistent or aperiodic SRS transmission for positioning to a location server, and the location server can forward that information to neighbor cells which are configured to receive that SRS transmission. Then the serving cell activates or triggers the SRS transmission for positioning as reported. The benefit for this method is that we can remove the requirement of periodic transmission of SRS for positioning sent to multiple neighbor cells, which causes physical resource waste and also increases UE power consumption. In a third method, a periodic SRS resource for positioning can be configured with a muting pattern and the UE is configured to transmit zero power on symbols and a SRS transmission period of that SRS resource indicated by the muting pattern.

FIG. 3 is a first flowchart of a method for SRS transmission according to the embodiments of the disclosure. As illustrated in FIG. 3, the method for SRS transmission includes the following operations.

Block 301, a serving cell transmits, to a UE, a first configuration for positioning, here, the first configuration is configuration of a first SRS resource or configuration of a first SRS resource set.

In an embodiment, the serving cell negotiates the configuration of first SRS resource with a location server, and the serving cell transmits the configuration of the first SRS resource to the UE. Here, the first SRS resource is a semi-persistent or aperiodic SRS resource. The first SRS resource is for positioning.

In an embodiment, the serving cell negotiates the configuration of first SRS resource set with a location server, and the serving cell transmits the configuration of the first SRS resource set to the UE. Here, the first SRS resource set includes semi-persistent or aperiodic SRS resources. The first SRS resource set is for positioning.

Block 302, the serving cell receives, from the location server, a first location information request, here, the first location information request is used for requesting the serving cell to measure the SRS transmission from the UE, here, a second location information request is transmitted to a neighbor cell by the location server and the second location information request is used for requesting the neighbor cell to measure the SRS transmission from the UE.

In an embodiment, after the serving cell receives the first location information request from the location server, the serving cell transmits schedule information to the location server. Here, the schedule information is used for scheduling transmission of the first SRS resource or transmission of the first SRS resource set.

In an embodiment, at least one of the first configuration or the schedule information is transmitted to the neighbor cell by the location server. Here, the at least one of the first configuration or the schedule information is used by the neighbor cell to measure the SRS transmission from the UE.

In an embodiment, when a location service is launched for the UE, the location server transmits the first location information request to the serving cell, and the first location information request is used for requesting the serving cell to measure the SRS transmission from the UE; further, the first location information request is also used for requesting the serving cell to activate (also called trigger) the UE to perform the transmission of the first SRS resource. Correspondingly, after the serving cell receives the first location information request, the serving cell transmits the schedule information to the location server (the schedule information is used for scheduling the transmission of the first SRS resource) and transmits activation signaling to the UE, the activation signaling is used for activating the UE to perform the transmission of the first SRS resource. The location server transmits a second location information request to the neighbor cell, here, the second location information request is used for requesting the neighbor cell to measure the SRS transmission from the UE; further, the location server forwards the at least one of the configuration of the first SRS resource or the schedule information to the neighbor cell. The UE performs, receiving the activation signaling, the transmission of the first SRS resource based on the configuration of the first SRS resource. Here, the transmission of the first SRS resource is performed, which means that SRS transmission is performed on the first SRS resource. The serving cell measures, based on the at least one of the configuration of the first SRS resource or the schedule information, the SRS transmission from the UE, and calculates a first uplink Time of Arrival (TOA) and then reports the first uplink TOA to the location server; the neighbor cell measures, based on the at least one of the configuration of the first SRS resource or the schedule information, the SRS transmission from the UE, and calculates a second uplink TOA and then reports the second uplink TOA to the location server; and the location server calculates, based on the first uplink TOA and the second uplink TOA, Uplink Time difference of arrival (UL-TDOA).

In another embodiment, when a location service is launched for the UE, the location server transmits the first location information request to the serving cell, and the first location information request is used for requesting the serving cell to measure the SRS transmission from the UE; further, the first location information request is also used for requesting the serving cell to activate the UE to perform the transmission of the first SRS resource set. Correspondingly, after the serving cell receives the first location information request, the serving cell transmits the schedule information to the location server (the schedule information is used for scheduling the transmission of the first SRS resource set) and transmits a first Downlink Control Information (DCI) to the UE, the first DCI is used for activating the transmission of the first SRS resource set. The location server transmits a second location information request to the neighbor cell, here, the second location information request is used for requesting the neighbor cell to measure the SRS transmission from the UE; further, the location server forwards the at least one of the configuration of the first SRS resource set or the schedule information to the neighbor cell. The UE performs, receiving the first DCI, the transmission of the first SRS resource set based on the configuration of the first SRS resource set. Here, the transmission of the first SRS resource set is performed, which means that SRS transmission is performed on each SRS resource in the first SRS resource set. The serving cell measures, based on the at least one of the configuration of the first SRS resource set or the schedule information, the SRS transmission from the UE, and calculates a first TOA and then reports the first uplink TOA to the location server; the neighbor cell measures, based on the at least one of the configuration of the first SRS resource set or the schedule information, the SRS transmission from the UE, and calculates a second uplink TOA and then reports the second uplink TOA to the location server; and the location server calculates, based on the first uplink TOA and the second uplink TOA, Uplink Time difference of arrival (UL-TDOA).

In an embodiment, the first SRS resource set includes multiple SRS resources, and configuration of each of the multiple SRS resources includes at least one of a first parameter, a second parameter, or a third parameter.

The first parameter is configured to determine an index of a starting Orthogonal Frequency Division Multiplexing (OFDM) symbol of the SRS resource in a slot.

The second parameter is configured to determine the number of OFDM symbols occupied by the SRS resource in a slot.

The third parameter is configured to determine an offset of a slot where the SRS resource is located with respect to a slot where the first DCI is located.

In an embodiment, the configuration of each SRS resource further includes a fourth parameter. The fourth parameter is configured to determine the number of times of transmission for the SRS resource. Here, the SRS resource is repeatedly transmitted in consecutive slots, or the SRS resource is repeatedly transmitted in non-consecutive slots.

In solution of the embodiment of the present application, a UE can be configured with a semi-persistent or aperiodic SRS resource for positioning by a serving gNB. The serving gNB and a location server can first negotiate configuration of the semi-persistent or aperiodic SRS resource for positioning. The serving gNB sends the configuration of the semi-persistent or aperiodic SRS resource to the UE. When receiving a location information request from the location server for the UE, the serving gNB can report schedule information on SRS transmission of the UE to the location server and then activate or trigger the UE to transmit SRS for positioning. The location server can send a location information request to a neighbor cell to request the neighbor cell to measure the SRS transmission from the UE. To assist the SRS reception, the location server can also send the transmission schedule information of the SRS transmission to the neighbor cell. When the measurement is done, the serving gNB can de-activate SRS transmission.

Figure 4:
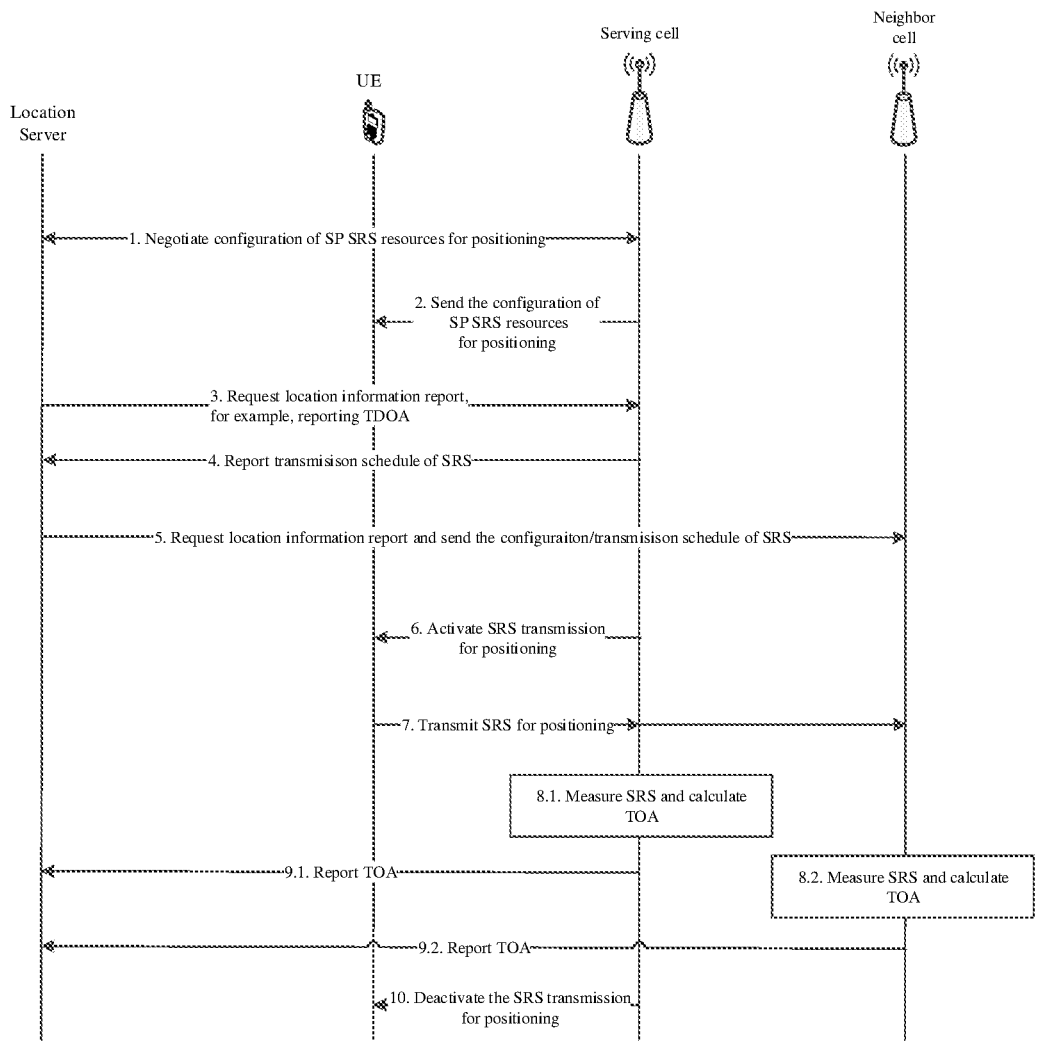
FIG. 4 is a flowchart of semi-persistent SRS transmission for positioning according to the embodiments of the disclosure.

FIG. 4 illustrates an example of semi-persistent SRS transmission for positioning according to the method of the present disclosure.

As illustrated in FIG. 4, for the UE, the serving cell can first negotiate configuration of semi-persistent SRS resource for positioning. The transmission of the SRS resource can be used to measure UL-TDOA. The serving cell sends the configuration of semi-persistent SRS resource for positioning to the UE. When a location service is launched for the UE, the location server sends a request of location information to the serving cell to request the serving cell to do one or more of the followings:

To activate the transmission of SRS for positioning from the UE;
To measure the SRS transmission sent by the UE to, for example, calculate the TOA.

After receiving the request from the location server, the serving cell can determine schedule information of SRS transmission for positioning for the UE and the serving cell reports the schedule information of SRS transmission to the location server. In one example, the schedule information of SRS transmission reported to the location server can include: the slot index and radio frame number where the SRS transmission is started, and the slot index and radio frame number where the SRS transmission is ended. The location server sends location request information to a neighbor cell to request measuring SRS transmission from the UE. The location server also sends the configuration of the semi-persistent SRS resource and the transmission schedule that is reported by the serving cell. The serving cell sends, to the UE, signaling to activate the transmission of semi-persistent SRS. After receiving activation command from the serving cell, the UE transmits the semi-persistent SRS resource as configured. The serving cell can measure the SRS transmission from the UE to calculate, for example, uplink TOA and then reports the uplink TOA to the location server. The neighbor cell can measure the SRS transmission from the UE according to the configuration and schedule information of SRS transmission from the location server to calculate, for example, uplink TOA and then reports the uplink TOA to the location server. Finally, the serving cell sends de-activation command to the UE to stop the transmission of SRS for positioning.

Figure 5:
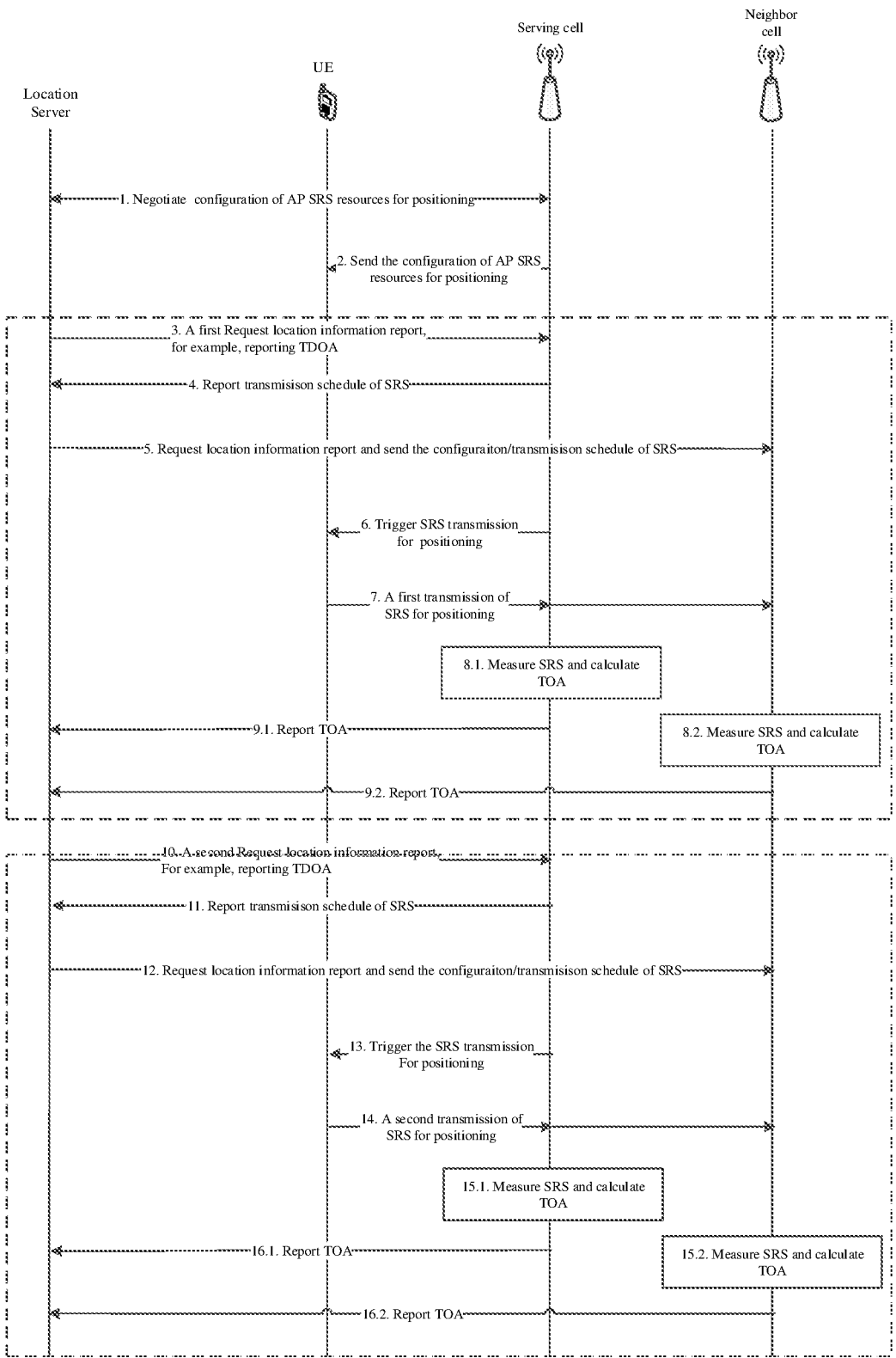
FIG. 5 is a flowchart of aperiodic SRS transmission for positioning according to the embodiments of the disclosure.

FIG. 5 illustrates an example of aperiodic SRS transmission for positioning according to the method of the present disclosure.

As illustrated in FIG. 5, for the UE, the serving cell can first negotiate configuration of aperiodic SRS resources for positioning. The transmission of the SRS resource can be used to measure UL-TDOA. In one example, the UE can be configured with a set of aperiodic SRS resources for positioning. In the set, the UE can be configured with $k \geq 1$ aperiodic SRS resources. Each SRS resource can be configured with one or more of the following parameters.

An index of a starting OFDM symbol, $l_0$, and the number of OFDM symbols, $N_s$, for resource allocation on one SRS resource in one slot.

A slot offset for the transmission of the SRS resource, $\Delta$, that indicates a slot location for the transmission of that SRS resource with respect to a triggering DCI. This parameter is used to support that the aperiodic SRS resource within the same set can be transmitted in different slot. The technical reasons for supporting transmitting aperiodic SRS resource in same set in different slot are as follows.

A) The SRS resource for positioning usually occupies large number of OFDM symbols. Thus, the number of SRS resources for positioning that can be transmitted in the same slot is limited due to limited number of OFDM symbols in one slot.

B) The SRS resource for positioning is supposed to be received by the serving cell and multiple neighbor cells. In FR2 system, beam sweeping operation is conducted on SRS transmission so that the SRS transmission can achieve different directions. Generally, the number of SRS resources needed for beam sweeping operation is larger than the number of SRS resources that can be accommodated within one slot.

In one example, the UE is configured with a first set of aperiodic SRS resources $\{S_1, S_2, \ldots, S_K\}$ for positioning. Each SRS resource $S_k$ (k=1, 2, ..., K) is configured with a slot offset $\Delta_k$. Then at slot n, the UE receives a DCI triggering the transmission of the first set of aperiodic SRS resources and the DCI indicates a slot offset $\Delta_{set}$ for the triggered first set of aperiodic SRS resources. Then the UE shall transmit aperiodic SRS in SRS resource $S_k$ in slot $$\left\lfloor n \times \frac{2^{\mu_{SRS}}}{2^{\mu_{PDCCH}}} \right\rfloor + \Delta_{set} + \Delta_k$$

$$(k = 1, 2, \cdots, K),$$

where $\mu_{SRS}$ is the subcarrier spacing configuration for the triggered SRS resources in the first set and $\mu_{PDCCH}$ is the subcarrier spacing configuration for the PDCCH carrying the triggering DCI.

In another example, the resource in the first set can be configured with a parameter $N_P$ to indicate the number of times of transmission for each resource upon one triggering. When being triggered, the UE repeats the transmission of one SRS resource in $N_P$ consecutive slots. In another example, when being triggered, the UE repeats the transmission of one SRS resource in every $P_{SRS}$ slots for $N_P$ times.

As illustrated in FIG. 5, the serving cell sends the configuration of the first set of aperiodic SRS resources for positioning to the UE. When a location service is launched for the UE, the location server sends a first request of location information to the serving cell to request the serving cell to do one or more of the followings:

To trigger the transmission of the configured first SRS set for positioning from the UE;
To measure the SRS transmission sent by the UE to, for example, calculate the TOA.

Upon receiving the request from the location server, the serving cell schedules the transmission of the first set of aperiodic SRS resources and then reports schedule information to the location server. The schedule information can be the slot index and radio frame number where the first SRS transmission of the first set is sent. The location server sends location request information to a neighbor cell to request measuring SRS transmission from the UE. The location server also sends the configuration of the aperiodic SRS resource and the transmission schedule that is reported by the serving cell. Then the serving cell can trigger the transmission of the first SRS resource set according to the schedule information reported to the location server. After receiving triggering DCI from the serving cell, the UE sends a first transmission in the SRS resources in the first set.

The serving cell can measure the SRS transmission from the UE to calculate, for example, uplink TOA and then reports the uplink TOA to the location server. The neighbor cell can measure the SRS transmission from the UE according to the configuration and schedule information of SRS transmission from the location server to calculate, for example, uplink TOA and then reports the uplink TOA to the location server. When another location service is launched, the location server sends a second request of location information to the serving cell to request the serving cell to schedule the SRS transmission and also report uplink signal measurement for location. Upon receiving the second request from the location server, the serving cell schedules the transmission of the first set of aperiodic SRS resources and then reports schedule information to the location server. The location server sends location request information to a neighbor cell to request measuring SRS transmission from the UE. The location server also sends the configuration of the aperiodic SRS resource and the transmission schedule that is reported by the serving cell. Then the serving cell can trigger the transmission of the first SRS resource set according to the schedule information reported to the location server. After receiving triggering DCI from the serving cell, the UE sends a second transmission in the SRS resources in the first set. The serving cell can measure the SRS transmission from the UE to calculate, for example, uplink TOA and then reports the uplink TOA to the location server. The neighbor cell can measure the SRS transmission from the UE according to the configuration and schedule information of SRS transmission from the location server to calculate, for example, uplink TOA and then reports the uplink TOA to the location server.

Figure 6:
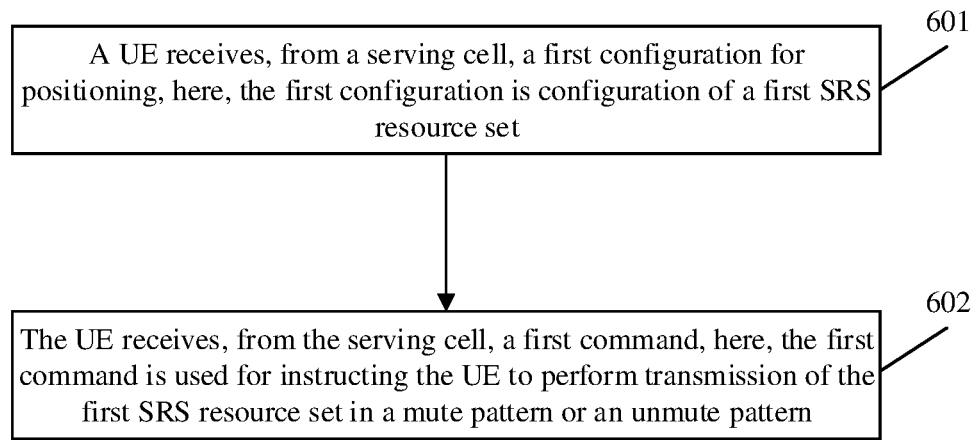
FIG. 6 is a second flowchart of a method for SRS transmission according to the embodiments of the disclosure.

FIG. 6 is a second flowchart of a method for SRS transmission according to the embodiments of the disclosure. As illustrated in FIG. 6, the method for SRS transmission includes the following operations.

Block 601, a UE receives, from a serving cell, a first configuration for positioning, here, the first configuration is configuration of a first SRS resource set.

In an embodiment, the serving cell negotiates the configuration of first SRS resource set with a location server, and the serving cell transmits the configuration of the first SRS resource set to the UE. Here, the first SRS resource set includes periodic SRS resources. The first SRS resource set is for positioning.

Block 602, the UE receives, from the serving cell, a first command, here, the first command is used for instructing the UE to perform transmission of the first SRS resource set in a mute pattern or an unmute pattern.

In an embodiment, the first command is a mute command, here, the mute command is used for instructing the UE to perform the transmission of the first SRS resource set in the mute pattern. Correspondingly, the UE transmits each SRS resource in the first SRS resource set with zero power.

I) In an embodiment, the mute command carries first information, the first information is used to determine a duration during which the UE transmits each SRS resource in the first SRS resource set with the zero power. Here, the duration is represented by a solution time, or the duration is represented by the number of slots. For specific implementation, the first information can refer to the description related to "$T_{mute}$" in the following embodiments.

II) In an embodiment, a first SRS resource in the first SRS resource set is configured with a mute pattern configuration. Here, the mute pattern configuration includes at least one of first indication information or second indication information.

The first indication information is used for indicating indexes of OFDM symbols, on which the transmission is performed with the zero power, in the first SRS resource.

The second indication information is used for indicating an index of SRS transmission occasion, in which the transmission is performed with the zero power, of the first SRS resource.

For specific implementation, the first indication information can refer to the description related to "muting pattern configuration" in the following embodiments.

II) In an embodiment, a first SRS resource in the first SRS resource set is configured with a mute pattern configuration. Here, the mute pattern configuration includes at least one of a first bitmap or third indication information.

Each bit in the first bitmap corresponds to a respective SRS period, and a value of the bit is used for indicating whether the UE transmits, in the SRS period corresponding to the bit, the first SRS resource with the zero power.

The third indication information is used for instructing the UE to transmit, on a part of multiple symbols, the first SRS resource with the zero power, the multiple symbols are symbols occupied by the first SRS resource.

For specific implementation, the first bitmap can refer to the description related to "$B_{muting}$" in the following embodiments. The third indication information can refer to the description related to "$D_{muting}$" in the following embodiments.

In an embodiment, the third indication information is implemented in the following two manners.

Manner 1: the third indication information is represented by at least one bit, and a value of the at least one bit is used for indicating at least one of: a starting symbol among the part of the multiple symbols, an ending symbol among the part of the multiple symbols, or the number of the part of the multiple symbols.

Manner 2: the third indication information is represented by a second bitmap, each bit in the second bitmap corresponds to a respective one of the multiple symbols, and a value of the bit is used for indicating whether the UE transmits, on the symbol corresponding to the bit, the first SRS resource with the zero power.

In an embodiment, the first SRS resource is configured with an SRS period and a slot offset. The UE determines a first frame number and a first slot number based on the SRS period, the slot offset and the mute pattern configuration. The first frame number is used for determining a first frame and the first slot number is used for determining a first slot. The UE transmits, on all or part of multiple symbols in the first slot of the first frame, the first SRS resource with the zero power, the multiple symbols are symbols occupied by the first SRS resource. Here, the part of multiple symbols is determined based on the third indication information in the above embodiments.

For specific implementation, determination of the first frame number ($n_f$) and the first slot number ($n_{s,f}^\mu$) can refer to the description of the following formula (1) and the following formula (2).

In an embodiment, the first command is an un-mute command, the un-mute command is used for instructing the UE to perform the transmission of the first SRS resource set in the un-mute pattern; correspondingly, the UE transmits each SRS resource in the first SRS resource set with a first power, here, the first power is determined based on an uplink power control parameter configured for the first SRS resource set.

In solution of the embodiment of the present application, a UE is configured with a first set of periodic SRS resources for positioning. The serving cell can send signaling command (for example a Medium Access Control (MAC) Control Element (CE) signaling) to mute or un-mute the transmission in the periodic SRS resources. Upon receiving a mute command from the serving cell, the UE shall transmit SRS transmission with zero power in the SRS resources in the first SRS resource set. Upon receiving an un-mute command from the serving cell, the UE shall resume SRS transmission with normal Tx power that is calculated based on uplink power control parameters configured for the SRS resources in the first SRS resource set.

Figure 7:
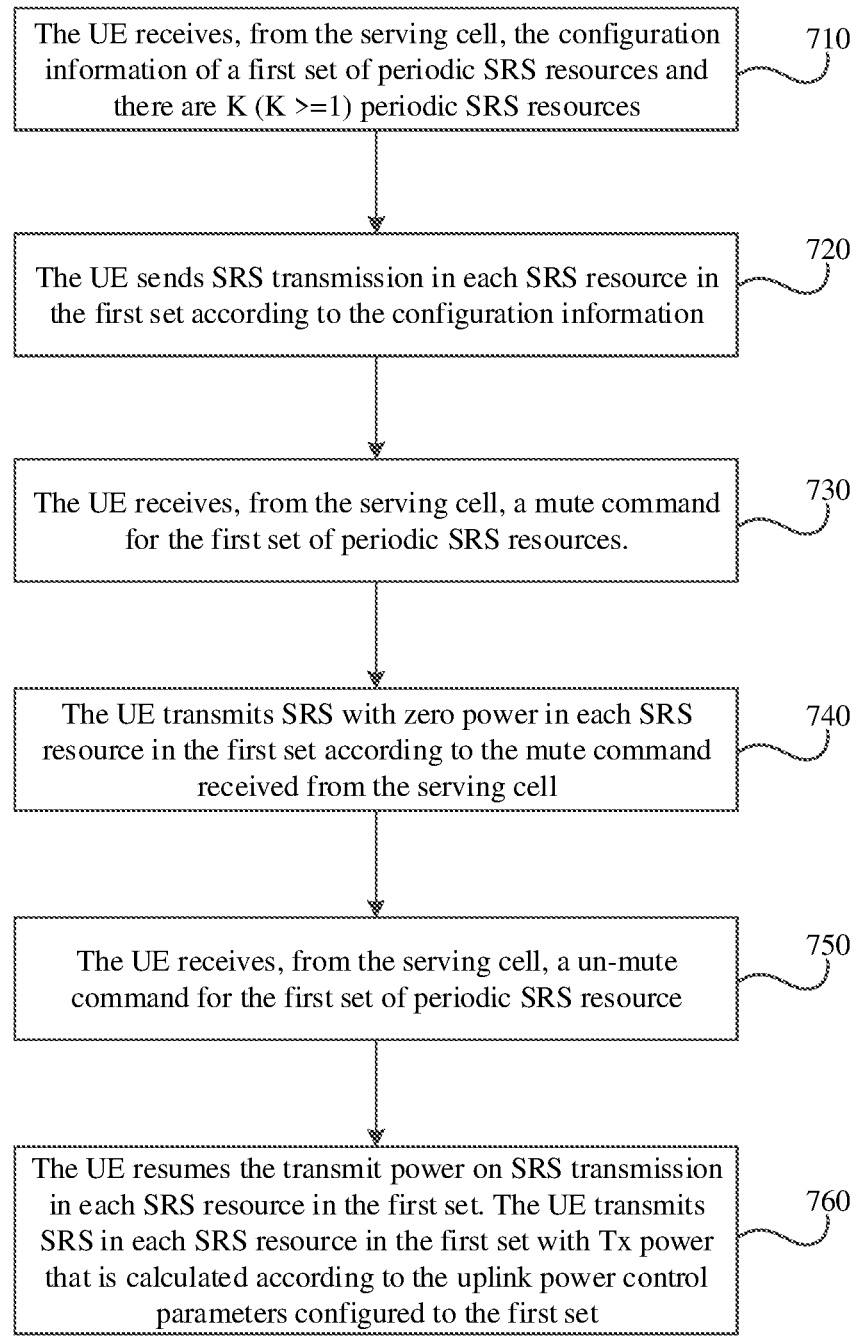
FIG. 7 is a flowchart of muting and un-muting periodic SRS transmission for positioning according to the embodiments of the disclosure.

FIG. 7 illustrates an example of muting and un-muting periodic SRS transmission for positioning according to the method of the present disclosure.

As illustrated in FIG. 7, the UE receives, from the serving cell, configuration information of a first set of periodic SRS resources for positioning in 710. There are k≥1 SRS resources in the first set. Then in 720, the UE sends SRS transmission in each SRS resource in the first set according to the configuration information received from the serving cell. In 730, the UE receives a mute command for the first SRS resource set. Then in 740, the UE shall transmit SRS with zero power in each SRS resource configured in the first set. In 750, the UE receives an un-mute command for the first SRS resource set. Then in 760, the UE shall resume the transmit power on SRS transmission in each SRS resource configured in the first set. The UE shall send SRS in each SRS resource configured in the first set with a transmit power that is calculated based on the uplink power control parameters configured for the first SRS resource set.

In one example, the UE receives, from the serving cell, configuration information of a first set of periodic SRS resources for positioning. The UE receives, from the serving cell, a mute command for the first SRS resource set and the mute command includes a time duration, $T_{mute}$, for muting the transmission of SRS resources in the first set. One example of the time duration $T_{mute}$ can be a length of time, for example, $T_{mute}$ milliseconds for that the UE shall mute the SRS transmission of the first SRS resource set. One example of the time duration $T_{mute}$ can be the number of slots during that the UE shall mute the SRS transmission of the first SRS resource set. Upon receiving a mute command indicating the time duration $T_{mute}$=M slots, at slot n, the UE shall mute the transmission of SRS in each SRS resources configured in the first set from the slot n+Ø until the slot n+Ø+M−1. During the slot n+Ø to slot n+Ø+M−1, the UE shall transmit SRS with zero power in each SRS resources configured in the first set. The UE shall resume transmit power on SRS transmission in each SRS resource configured in the first set starting from slot n+Ø+M if no more mute command for the first set is received before slot n+Ø+M.

In one method, a first periodic SRS resource for positioning can be configured with a muting pattern configuration. The muting pattern configuration can indicate the UE of indexes of OFDM symbols configured in the first SRS resource and index of SRS transmission occasion (i.e., which period) of the first SRS resource on which the UE can be requested to transmit zero power. According to the muting pattern configuration configured to the first periodic SRS resource, the UE shall transmit zero power for SRS transmission on OFDM symbols indicated in the muting pattern configuration and in the SRS transmission occasion indicated in the muting pattern configuration. For the first SRS resource configured with $N_{sym}$ symbols and periodicity $P_{SRS}$ slots, the muting pattern configuration can provide the following parameters.

A periodic muting sequence $B_{muting}$, which is used to indicate in which SRS period the UE shall transmit the SRS transmission of the first SRS resource with zero power. $B_{muting}$ can be a bit string of length $N_{B_{muting}}$ : $\{b_0 b_1 b_2 \cdots b_{N_{B_{muting}}-1}\}$.

Example of $N_{B_{muting}}$ can be 2, 4, 8, 16, or 32. Each bit in $B_{muting}$ represents whether the UE shall transmit the SRS transmission of the first SRS resource in the corresponding period with zero power or not.

Symbol-level muting configuration, $D_{muting}$, that is used to indicate one part of the $N_{sym}$ symbols over which the UE shall transmit the SRS transmission of the first SRS resource with zero power.

One example for $D_{muting}$ is that $D_{muting}$ provides a one-bit value, $k_{sym,muting}$, that is used to indicate a starting OFDM symbol or an ending OFDM symbol among those $N_{sym}$ symbols allocated for the first SRS resource and a number of symbols, $n_{sym,muting}$. If $k_{sym,muting}$ indicates the starting symbol, then the UE shall transmit the SRS transmission of the first SRS resource with zero power in $n_{sym,muting}$ symbols starting from the starting OFDM symbol, $m_{starting}$. If $k_{sym,muting}$ indicates the ending symbol, then the UE shall transmit the SRS transmission of the first SRS resource with zero power in symbols $\{m_{starting}+N_{sym}-n_{sym,muting}, \ldots, m_{starting}+N_{sym}-2, m_{starting}+N_{sym}-1\}$ allocated for the first SRS resource.

One example for $D_{muting}$ is that $D_{muting}$ is bit string of length $N_{sym}$. Each bit in $D_{muting}$ corresponds to one symbol among those $N_{sym}$ symbols allocated to the first SRS resource. For example, if a bit in $D_{muting}$ is set to "0", then the UE shall transmit the SRS transmission with zero power in the symbol corresponding to that bit.

In an example, the UE is configured with the first SRS resource with periodicity $P_{SRS}$ and slot offset $SRS_{OFFSET}$. The UE is configured with a periodic muting sequence $B_{muting}$ for the first SRS resource. The UE shall determine the SRS periods for transmitting zero power. If the bit $b_l$ (l=0, 1, 2 ..., $N_{B_{muting}}$) in $B_{muting}$ is set to "0", then the UE shall transmit the SRS transmission of the first SRS resource with zero power in all the symbols allocated to the first SRS resource in a slot with slot number $n_{s,f}^\mu$ in a frame with frame number $n_f$ if the slot number and frame number satisfy the following formula (1).

$$(n_f \times N_{slot}^{frame,\mu} + n_{s,f}^\mu - SRS_{OFFSET}) \text{Mod } P_{SRS} = 0, \text{ and} \quad (1)$$

$$\frac{(n_f \times N_{slot}^{frame,\mu} + n_{s,f}^\mu - SRS_{OFFSET})}{P_{SRS}} \text{Mod } N_{B_{muting}} = 1$$

Where $\mu$ is numerology used by the SRS transmission, $N_{slot}^{frame,\mu}$ is the number of slots contained in one frame for numerology $\mu$.

In an example, the UE is configured with the first SRS resource with periodicity $P_{SRS}$ and slot offset $SRS_{OFFSET}$. The UE is configured with a periodic muting sequence $B_{muting}$ and Symbol-level muting configuration $D_{muting}$ for the first SRS resource. The UE shall determine the SRS periods and indexes of the symbols in one period for transmitting zero power. If the bit $b_l$ (l=0, 1, 2 ..., $N_{B_{muting}}$) in $B_{muting}$ is set to "0", then the UE shall transmit the SRS transmission of the first SRS resource with zero power in the symbols that are indicated by $D_{muting}$ for zero power transmission among all $N_{sym}$ symbols allocated to the first SRS resource in a slot with slot number $n_{s,f}^\mu$ in a frame with frame number $n_f$ if the slot number and frame number satisfy the following formula (2).

$$(n_f \times N_{slot}^{frame,\mu} + n_{s,f}^{\mu} - SRS_{OFFSET}) \text{Mod } P_{SRS} = 0, \text{ and} \qquad (2)$$

$$\frac{(n_f \times N_{slot}^{frame,\mu} + n_{s,f}^{\mu} - SRS_{OFFSET})}{P_{SRS}} \text{Mod } N_{B_{muting}} = 1$$

Where $\mu$ is numerology used by the SRS transmission, $N_{slot}^{frame,\mu}$ is the number of slots contained in one frame for numerology $\mu$.

To implement the above methods for SRS transmission, the embodiments of the present disclosure also provide devices for SRS transmission.

Figure 8:
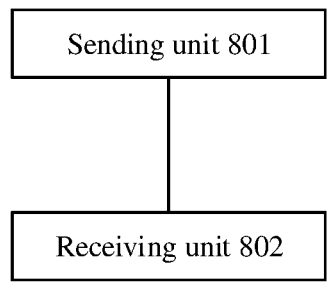
FIG. 8 is a first diagram of a structure composition of a device for SRS transmission according to the embodiments of the disclosure.

FIG. 8 is a first diagram of a structure composition of a device for SRS transmission according to the embodiments of the disclosure. The device is for use in a network device, such as a serving base station. As illustrated in FIG. 8, the device for SRS transmission includes a sending unit 801 and a receiving unit 802.

The sending unit 801 is configured to transmit, to a UE, a first configuration for positioning, here, the first configuration is configuration of a first SRS resource or configuration of a first SRS resource set.

The receiving unit 802 is configured to receive, from a location server, a first location information request, here, the first location information request is used for requesting a serving cell to measure the SRS transmission from the UE, here, a second location information request is transmitted to a neighbor cell by the location server and the second location information request is used for requesting the neighbor cell to measure the SRS transmission from the UE.

In an embodiment, the sending unit 801 is configured to transmit schedule information to the location server. The schedule information is used for scheduling transmission of the first SRS resource or transmission of the first SRS resource set.

In an embodiment, at least one of the first configuration or the schedule information is transmitted to the neighbor cell by the location server. Here, the at least one of the first configuration or the schedule information is used by the neighbor cell to measure the SRS transmission from the UE.

In an embodiment, the first location information request is also used for requesting the serving cell to activate the UE to perform the transmission of the first SRS resource.

In an embodiment, the sending unit 801 is configured to transmit activation signaling to the UE, the activation signaling is used for activating the UE to perform the transmission of the first SRS resource.

In an embodiment, the first location information request is also used for requesting the serving cell to activate the UE to perform the transmission of the first SRS resource set.

In an embodiment, the sending unit 801 is configured to transmit a first DCI to the UE, here, the first DCI is used for activating the transmission of the first SRS resource set.

In an embodiment, the first SRS resource set includes multiple SRS resources, and configuration of each of the multiple SRS resources includes at least one of a first parameter, a second parameter, or a third parameter.

The first parameter is configured to determine an index of a starting OFDM symbol of the SRS resource in a slot.

The second parameter is configured to determine the number of OFDM symbols occupied by the SRS resource in a slot.

The third parameter is configured to determine an offset of a slot where the SRS resource is located with respect to a slot where the first DCI is located.

In an embodiment, the configuration of each SRS resource further includes a fourth parameter configured to determine the number of times of transmission for the SRS resource.

In an embodiment, the SRS resource is repeatedly transmitted in consecutive slots, or the SRS resource is repeatedly transmitted in non-consecutive slots.

In an embodiment, the first SRS resource is a semi-persistent or aperiodic SRS resource. The first SRS resource set includes semi-persistent or aperiodic SRS resources.

Those skilled in the art should understand that the description related to the above device for SRS transmission of the embodiments of the present disclosure can be understood by referring to the description related to the above method for SRS transmission of the embodiments of the present disclosure.

Figure 9:
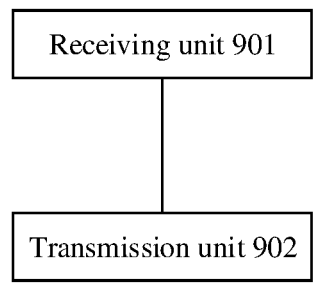
FIG. 9 is a second diagram of a structure composition of a device for SRS transmission according to the embodiments of the disclosure.

FIG. 9 is a second diagram of a structure composition of a device for SRS transmission according to the embodiments of the disclosure. The device is for use in a UE. As illustrated in FIG. 9, the device for SRS transmission includes a receiving unit 901.

The receiving unit 901 is configured to receive, from a serving cell, a first configuration for positioning, here, the first configuration is configuration of a first SRS resource set; and to receive a first command from the serving cell, here, the first command is used for instructing the UE to perform transmission of the first SRS resource set in a mute pattern or an unmute pattern.

In an embodiment, the first command is a mute command, here, the mute command is used for instructing the UE to perform the transmission of the first SRS resource set in the mute pattern. The device further includes a transmission unit 902.

The transmission unit 902 is configured to transmit each SRS resource in the first SRS resource set with zero power.

In an embodiment, the mute command carries first information, here, the first information is used to determine a duration during which the UE transmits each SRS resource in the first SRS resource set with the zero power.

In an embodiment, the duration is represented by a solution time, or the duration is represented by the number of slots.

In an embodiment, a first SRS resource in the first SRS resource set is configured with a mute pattern configuration. Here, the mute pattern configuration includes at least one of first indication information or second indication information.

The first indication information is used for indicating indexes of OFDM symbols, on which the transmission is performed with the zero power, in the first SRS resource.

The second indication information is used for indicating an index of SRS transmission occasion, in which the transmission is performed with the zero power, of the first SRS resource.

In an embodiment, a first SRS resource in the first SRS resource set is configured with a mute pattern configuration. Here, the mute pattern configuration includes at least one of a first bitmap or third indication information.

Each bit in the first bitmap corresponds to a respective SRS period, and a value of the bit is used for indicating whether the UE transmit, in the SRS period corresponding to the bit, the first SRS resource with the zero power.

The third indication information is used for instructing the UE to transmit, on a part of multiple symbols, the first SRS resource with the zero power, the multiple symbols are symbols occupied by the first SRS resource.

In an embodiment, the third indication information is represented by at least one bit, and a value of the at least one bit is used for indicating at least one of: a starting symbol among the part of the multiple symbols, an ending symbol among the part of the multiple symbols, or the number of the part of the multiple symbols.

In an embodiment, the third indication information is represented by a second bitmap, each bit in the second bitmap corresponds to a respective one of the multiple symbols, and a value of the bit is used for indicating whether the UE transmits, on the symbol corresponding to the bit, the first SRS resource with the zero power.

In an embodiment, the first SRS resource is configured with an SRS period and a slot offset. The device further includes a determination unit (not illustrated in drawing).

The determination unit is configured to determine a first frame number and a first slot number based on the SRS period, the slot offset and the mute pattern configuration. The first frame number is used for determining a first frame and the first slot number is used for determining a first slot.

The transmission unit 902 is configured to transmits, on all or part of multiple symbols in the first slot of the first frame, the first SRS resource with the zero power, the multiple symbols are symbols occupied by the first SRS resource.

In an embodiment, the first command is an un-mute command, the un-mute command is used for instructing the UE to perform the transmission of the first resource set in the un-mute pattern. The device further includes a transmission unit 902.

The transmission unit 902 is configured to transmit each SRS resource in the first SRS resource set with a first power, here, the first power is determined based on an uplink power control parameter configured for the first SRS resource set.

In an embodiment, the first SRS resource set includes periodic SRS resources.

Those skilled in the art should understand that the descriptions related to the device for SRS transmission in the embodiments of the present disclosure can be understood with reference to the descriptions related to the method for SRS transmission in the embodiments of the present disclosure.

Figure 10:
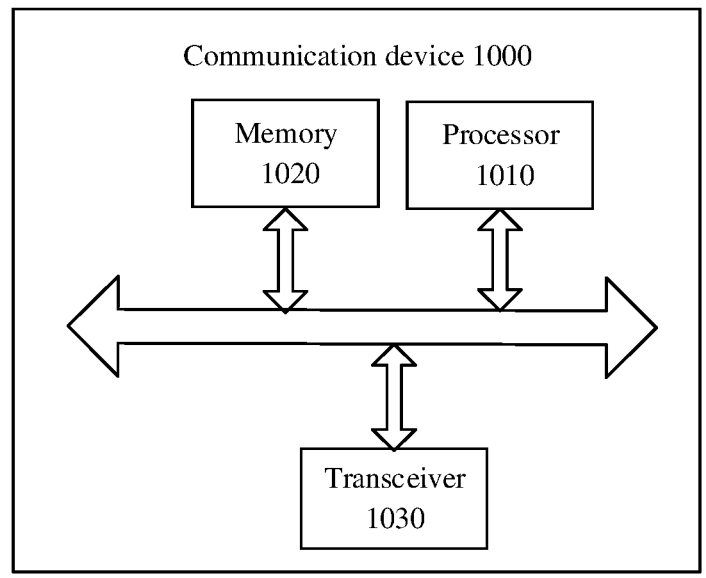
FIG. 10 is a structure diagram of a communication device according to the embodiments of the disclosure.

FIG. 10 is a structural diagram of a communication device 1000 according to the embodiments of the present disclosure. The communication device may be a UE, or may be a network device (e.g., a base station). The communication device 1000 as illustrated in FIG. 10 includes a processor 1010 configured to call and execute computer programs in a memory to perform the methods in the embodiments of the present disclosure.

In the embodiments of the present disclosure, the communication device 1000 further includes a memory 1020. The processor 1010 may be configured to call and execute computer programs in the memory 1020 to perform the methods in the embodiments of the present disclosure.

Here, the memory 1020 may be a separate device independent of the processor 1010, or may be integrated into the processor 1010.

Optionally, as illustrated in FIG. 10, the communication device 1000 further includes a transceiver 1030. The processor 1010 may control the transceiver 1030 to perform communication with another device, so as to transmit information or data to the another device or receive information or data from the another device.

Here, the transceiver 1030 may include a transmitter and a receiver. The transceiver 1030 may further include an antenna, and the number of antennas may be one or more.

Optionally, the communication device 1000 may be a network device in the embodiments of the present disclosure, and the communication device 1000 may implement the corresponding processes implemented by the network device in various methods of the embodiments of the present disclosure. For simplicity, details are not described herein again.

Optionally, the communication device 1000 may be a mobile terminal/UE in the embodiments of the present disclosure, and the communication device 1000 may implement the corresponding processes implemented by the mobile terminal/UE in various methods of the embodiments of the present disclosure. For simplicity, details are not described herein again.

Figure 11:
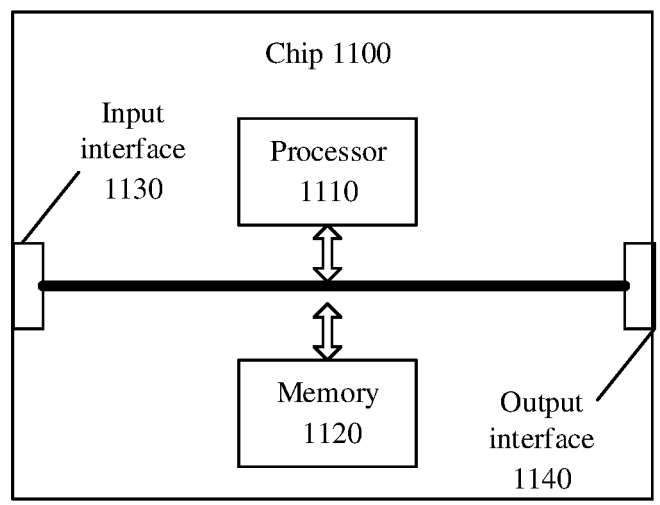
FIG. 11 is a structure diagram of a chip according to the embodiments of the disclosure.

FIG. 11 is a structural diagram of a chip according to the embodiments of the present disclosure. As illustrated in FIG. 11, the chip 1100 includes a processor 1110 configured to call and execute computer programs in a memory to perform the methods in the embodiments of the present disclosure.

Optionally, as illustrated in FIG. 11, the chip 1100 further includes a memory 1120. The processor 1110 may be configured to call and execute computer programs in the memory 1120 to perform the methods in the embodiments of the present disclosure.

Here, the memory 1120 may be a separate device independent of the processor 1110, or may be integrated into the processor 1110.

Optionally, the chip 1100 may further include an input interface 1130. The processor 1110 may control the input interface 1130 to communicate with another device or chip, so as to obtain information or data from the another device or chip.

Optionally, the chip 1100 may further include an output interface 1140. The processor 1110 may control the output interface 1140 to communicate with another device or chip, so as to output information or data to the another device or chip.

Optionally, the chip may be applied to the network device in the embodiments of the present disclosure, and the chip may implement the corresponding processes implemented by the network device in various methods of the embodiments of the present disclosure. For simplicity, details are not described herein again.

Optionally, the chip may be applied to the mobile terminal/UE in the embodiments of the present disclosure, and the chip may implement the corresponding processes implemented by the mobile terminal/UE in various methods of the embodiments of the present disclosure. For simplicity, details are not described herein again.

It should be understood that the chip in the embodiments of the present application may also be called as a system-level chip, a system chip, a chip system or a system-on-chip.

Figure 12:
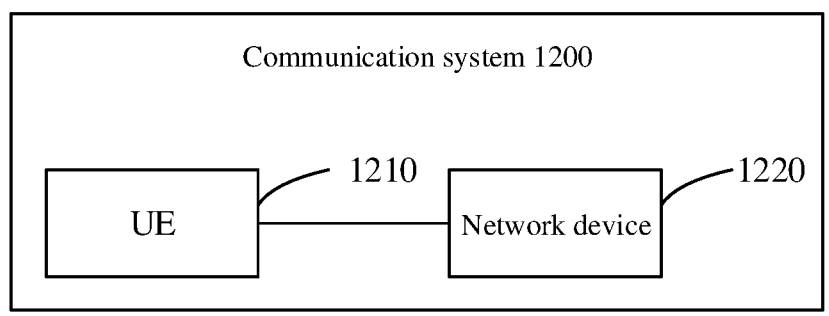
FIG. 12 is a block diagram of a communication system according to the embodiments of the disclosure.

FIG. 12 is a block diagram of a communication system 1200 according to the embodiments of the present disclosure. As illustrated in FIG. 12, the communication system 1200 includes a UE 1210 and a network device 1220.

Here, the UE 1210 may be configured to perform the corresponding functions implemented by the UE in the above methods; and the network device 1220 may be configured to perform the corresponding functions implemented by the network device in the above methods. For simplicity, details are not described herein again.

It should be understood that the processor in the embodiments of the disclosure may be an integrated circuit chip and has a signal processing capability. In the implementation process, each operation of the foregoing method embodiments may be completed by an integrated logic circuit of hardware in a processor or instructions in a form of software in a processor. The above processor may be a general-purpose processor, a Digital Signal Processor (DSP), an Application Specific Integrated Circuit (ASIC), a Field Programmable Gate Array (FPGA) or another Programming logic devices, a discrete gate or transistor logic device, a discrete hardware component, or the like. Various methods, operations, and logical blocks disclosed in the embodiments of the present disclosure can be implemented or executed. A general-purpose processor may be a microprocessor or the processor may be any conventional processor or the like. The operations of the methods disclosed in combination with the embodiments of the present disclosure may be directly implemented by a hardware decoding processor, or may be implemented by a combination of hardware and software modules in the decoding processor. The software modules may be located in a mature storage medium in the art, such as a Random Access Memory (RAM), a flash memory, a Read-Only Memory (ROM), a Programmable Read-Only Memory (PROM), an Erasable Programmable Read-Only Memory (EPROM), an Electrically Erasable Programmable Read-Only Memory (EEPROM), a register, and the like. The storage medium is located in a memory, and the processor reads the information in the memory and completes the operations of the foregoing methods in combination with the hardware of the processor.

It should be understood that the memory in the embodiments of the present disclosure may be a volatile memory or a non-volatile memory, or may include the volatile memory and the non-volatile memory. The non-volatile memory may be a ROM, a PROM, an EPROM, EEPROM or a flash memory, or the like. The volatile memory may be a RAM, which is used as an external cache. By way of example, but not limitation, many forms of RAMs are available, such as a Static Random Access Memory (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described herein is intended to include, but is not limited to, these and any other suitable types of memory.

It should be understood that the above memory are exemplary but not restrictive. For example, the memory in the embodiments of the present disclosure may also be a Static RAM (SRAM), a Dynamic RAM (DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), etc. That is, the memories in the embodiments of the present application are intended to include, but not limited to, these and any other suitable types of memories.

The embodiments of the present disclosure further provide a computer-readable storage medium for storing computer programs.

Optionally, the computer-readable storage medium may be applied to the network device in the embodiments of the present disclosure, and the computer programs cause a computer to execute the corresponding processes implemented by the network device in each method in the embodiments of the present disclosure. For simplicity, details are not described herein again.

Optionally, the computer-readable storage medium may be applied to the mobile terminal/UE in the embodiments of the present disclosure, and the computer programs cause a computer to execute the corresponding processes implemented by the mobile terminal/UE in each method in the embodiments of the present disclosure. For simplicity, details are not described herein again.

The embodiments of the present disclosure further provide a computer program product including computer program instructions.

Optionally, the computer program product can be applied to the network device in the embodiments of the present disclosure, and the computer program instructions cause a computer to execute the corresponding processes implemented by the network device in each method in the embodiments of the present disclosure. For simplicity, details are not described herein again.

Optionally, the computer program product can be applied to the mobile terminal/UE in the embodiments of the present disclosure, and the computer program instructions cause a computer to execute the corresponding processes implemented by the mobile terminal/UE in each method in the embodiments of the present disclosure. For simplicity, details are not described herein again.

The embodiments of the present disclosure further provide a computer program.

Optionally, the computer program can be applied to the network device in the embodiments of the present disclosure, and when run on a computer, causes the computer to execute the corresponding processes implemented by the network device in each method in the embodiments of the present disclosure. For simplicity, details are not described herein again.

Optionally, the computer program can be applied to the mobile terminal/UE in the embodiments of the present disclosure, and when run on a computer, causes the computer to execute the corresponding processes implemented by the mobile terminal/UE in each method in the embodiments of the present disclosure. For simplicity, details are not described herein again.

A person of ordinary skill in the art may be aware that example, units and algorithm operations described in combination with the embodiments of in present disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that for the purpose of convenient and brief description, detailed working processes of the foregoing system, device, and unit may refer to corresponding processes in the foregoing method embodiments, and details are not described herein again.

In the several embodiments provided in the present disclosure, it should be understood that the disclosed system, device, and method may be implemented in other manners. For example, the described device embodiments are merely examples. For example, the unit division is merely logical function division. During actual implementation, there may be another division manner. For example, a plurality of units or components may be combined or integrated into another system, or some features may be ignored or not performed.

In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the solutions of the embodiments of the disclosure.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device, or the like) to perform all or some of the operations described in the embodiments of the disclosure. The foregoing storage medium includes: any medium that can store program codes, such as a USB flash drive, a removable hard disk, a ROM, a RAM, a magnetic disk, or a compact disc.

The foregoing descriptions are merely specific implementations of the disclosure, but are not intended to limit the scope of protection of the disclosure. Any variation or replacement readily figured out by a person skilled in the art within the technical scope disclosed in the disclosure shall fall within the scope of protection of the present disclosure. Therefore, the scope of protection of the present disclosure shall be subject to the scope of protection of the claims.

The invention claimed is:

1. A method for Sounding Reference Signal (SRS) transmission, comprising:
   negotiating, by a serving cell, a first configuration for positioning with a location server, the first configuration being configuration of a first SRS resource or configuration of a first SRS resource set, the first SRS resource is a semi-persistent or aperiodic SRS resource, and the first SRS resource set includes semi-persistent or aperiodic SRS resources;
   transmitting, by the serving cell, to User Equipment (UE), the first configuration for positioning; and
   receiving, by the serving cell, a first location information request from the location server, the first location information request being used for requesting the serving cell to measure the SRS transmission from the UE; and
   transmitting, by the serving cell, schedule information to the location server, the schedule information being used for scheduling transmission of the first SRS resource or transmission of the first SRS resource set,
   wherein a second location information request, the first configuration and the schedule information are transmitted to a neighbor cell by the location server, the second location information request is used for requesting the neighbor cell to measure the SRS transmission from the UE, and the first configuration and the schedule information are used by the neighbor cell to measure the SRS transmission from the UE.

2. The method of claim 1, wherein the first location information request is also used for requesting the serving cell to activate the UE to perform transmission of the first SRS resource.

3. The method of claim 2, further comprising:
   transmitting, by the serving cell, activation signaling to the UE, the activation signaling being used for activating the UE to perform the transmission of the first SRS resource.

4. The method of claim 1, wherein the first location information request is also used for requesting the serving cell to activate the UE to perform transmission of the first SRS resource set.

5. The method of claim 4, further comprising:
   transmitting, by the serving cell, a first Downlink Control Information (DCI) to the UE, the first DCI being used for activating the transmission of the first SRS resource set.

6. The method of claim 5, wherein the first SRS resource set includes a plurality of SRS resources, configuration of each of the plurality of SRS resources comprises at least one of:
   a first parameter, configured to determine an index of a starting Orthogonal Frequency Division Multiplexing (OFDM) symbol of the SRS resource in a slot;
   a second parameter, configured to determine a number of OFDM symbols occupied by the SRS resource in a slot; or
   a third parameter, configured to determine an offset of a slot where the SRS resource is located with respect to a slot where the first DCI is located.

7. The method of claim 6, wherein the configuration of each of the plurality of SRS resources further comprises a fourth parameter, configured to determine a number of times of transmission for the SRS resource.

8. The method of claim 7, wherein the SRS resource is repeatedly transmitted in consecutive slots, or the SRS resource is repeatedly transmitted in non-consecutive slots.

9. A device for Sounding Reference Signal (SRS) transmission, comprising:
   a transceiver;
   a processor; and
   a memory for storing computer program instructions that, when executed by the processor, cause the processor to:
   negotiate a first configuration for positioning with a location server, the first configuration being configuration of a first SRS resource or configuration of a first SRS resource set, the first SRS resource is a semi-persistent or aperiodic SRS resource, and the first SRS resource set includes semi-persistent or aperiodic SRS resources;
   transmit, to User Equipment (UE), the first configuration for positioning through the transceiver;
   receive, through the transceiver, a first location information request from the location server, the first location information request being used for requesting a serving cell to measure the SRS transmission from the UE,
   wherein a second location information request, the first configuration and the schedule information are transmitted to a neighbor cell by the location server, the second location information request is used for requesting the neighbor cell to measure the SRS transmission from the UE, and the first configuration and the schedule information are used by the neighbor cell to measure the SRS transmission from the UE.

10. The device of claim 9, wherein the first location information request is also used for requesting the serving cell to activate the UE to perform transmission of the first SRS resource.

11. The device of claim 10, wherein the processor is further configured to:
transmit, through the transceiver, activation signaling to the UE, the activation signaling being used for activating the UE to perform the transmission of the first SRS resource.

12. The device of claim 9, wherein the first location information request is also used for requesting the serving cell to activate the UE to perform transmission of the first SRS resource set.

13. The device of claim 12, wherein the processor is further configured to:
transmit, through the transceiver, a first Downlink Control Information (DCI) to the UE, the first DCI being used for activating the transmission of the first SRS resource set.

14. The device of claim 13, wherein the first SRS resource set includes a plurality of SRS resources, configuration of each of the plurality of SRS resources comprises at least one of:
a first parameter, configured to determine an index of a starting Orthogonal Frequency Division Multiplexing (OFDM) symbol of the SRS resource in a slot;
a second parameter, configured to determine a number of OFDM symbols occupied by the SRS resource in a slot; or
a third parameter, configured to determine an offset of a slot where the SRS resource is located with respect to a slot where the first DCI is located.

15. The device of claim 14, wherein the configuration of each of the plurality of SRS resources further comprises a fourth parameter, configured to determine a number of times of transmission for the SRS resource.

16. The device of claim 15, wherein the SRS resource is repeatedly transmitted in consecutive slots, or the SRS resource is repeatedly transmitted in non-consecutive slots.

17. A device for Sounding Reference Signal (SRS) transmission, comprising:
a transceiver;
a processor; and
a memory for storing computer program instructions that, when executed by the processor, cause the processor to:
negotiate a first configuration for positioning with a serving cell, the first configuration being configuration of a first SRS resource or configuration of a first SRS resource set, wherein the first SRS resource is a semi-persistent or aperiodic SRS resource, and the first SRS resource set includes semi-persistent or aperiodic SRS resources;
transmit, through the transceiver, a first location information request to the serving cell, the first location information request being used for requesting the serving cell to measure the SRS transmission from User Equipment (UE);
receive, through the transceiver, schedule information from the serving cell, the schedule information being used for scheduling transmission of the first SRS resource or transmission of a first SRS resource set; and
transmit, through the transceiver, a second location information request, the first configuration and the schedule information to a neighbor cell, the second location information request being used for requesting the neighbor cell to measure the SRS transmission from the UE, and the first configuration and the schedule information being used by the neighbor cell to measure the SRS transmission from the UE.

18. The device of claim 17, wherein the first location information request is also used for requesting the serving cell to activate the UE to perform transmission of the first SRS resource.

19. The device of claim 17, wherein the first location information request is also used for requesting the serving cell to activate the UE to perform transmission of the first SRS resource set.

20. The device of claim 19, wherein the first SRS resource set includes a plurality of SRS resources, configuration of each of the plurality of SRS resources comprises at least one of:
a first parameter, configured to determine an index of a starting Orthogonal Frequency Division Multiplexing (OFDM) symbol of the SRS resource in a slot;
a second parameter, configured to determine a number of OFDM symbols occupied by the SRS resource in a slot; or
a third parameter, configured to determine an offset of a slot where the SRS resource is located with respect to a slot where a first Downlink Control Information (DCI) from the serving cell is located, wherein the first DCI is used for activating transmission of the first SRS resource set.

* * * * *